United States Patent
Chandrasekharan et al.

(10) Patent No.: US 9,873,503 B2
(45) Date of Patent: Jan. 23, 2018

(54) TAILPLANE WITH POSITIVE CAMBER

(71) Applicant: LEARJET INC., Wichita, KS (US)

(72) Inventors: Reuben Chandrasekharan, Wichita, KS (US); Nick Iarocci, Laval (CA); Shermineh Vafa, Montreal (CA); Iyad Akel, Laval (CA)

(73) Assignee: LEARJET INC., Wichita, KS (US)

( * ) Notice: Subject to any disclaimer, the term of this patent is extended or adjusted under 35 U.S.C. 154(b) by 148 days.

(21) Appl. No.: 14/906,605

(22) PCT Filed: Jul. 21, 2014

(86) PCT No.: PCT/US2014/047374
§ 371 (c)(1),
(2) Date: Jan. 21, 2016

(87) PCT Pub. No.: WO2015/053838
PCT Pub. Date: Apr. 16, 2015

(65) Prior Publication Data
US 2016/0176505 A1    Jun. 23, 2016

Related U.S. Application Data

(60) Provisional application No. 61/856,980, filed on Jul. 22, 2013.

(51) Int. Cl.
*B64C 5/02* (2006.01)
*B64C 9/00* (2006.01)

(52) U.S. Cl.
CPC . *B64C 5/02* (2013.01); *B64C 9/00* (2013.01)

(58) Field of Classification Search
CPC .................................. B64C 9/00; B64C 5/02
See application file for complete search history.

(56) References Cited

U.S. PATENT DOCUMENTS 1,375,421 A * 4/1921 Scott-Paine ............... B64C 9/00
                                                              244/87
4,291,853 A * 9/1981 Sigalla ..................... B64C 5/02
                                                              244/199.1
(Continued)

FOREIGN PATENT DOCUMENTS

CH           133987 A    6/1929
CN       101495367 A    7/2009
(Continued)

OTHER PUBLICATIONS

Chinese Office Action dated Aug. 16, 2017, for Chinese Patent Application No. 201480041705.6 (Year: 2017).*
(Continued)

*Primary Examiner* — Philip J Bonzell
*Assistant Examiner* — Michael B Kreiner
(74) *Attorney, Agent, or Firm* — Karceski IP Law, PLLC

(57) ABSTRACT

Tailplanes and empennages for aircraft are disclosed. An exemplary tailplane disclosed includes a stabilizer having a fixed shape and an elevator movably secured to the stabilizer. The elevator is movable from a neutral position relative to the stabilizer. The stabilizer and the elevator define an airfoil cross-sectional shape having a positive camber when the elevator is in the neutral position. The positive camber of the airfoil cross-sectional shape may facilitate movement of the elevator during some flight conditions. Also disclosed are tailplanes having camber distributions that vary along the spans of the tailplanes.

23 Claims, 14 Drawing Sheets

(56) References Cited

U.S. PATENT DOCUMENTS

| | | | |
|---|---|---|---|
| 6,792,844 | B1 | 9/2004 | Gedge et al. |
| 8,109,465 | B1 | 2/2012 | Heer |
| 8,418,958 | B2 | 4/2013 | Evans |
| 2011/0024557 | A1 | 2/2011 | Brighton et al. |
| 2016/0325821 | A1* | 11/2016 | Golshany .................. B64C 1/26 |

FOREIGN PATENT DOCUMENTS

| | | |
|---|---|---|
| CN | 102452479 A | 5/2012 |
| FR | 748149 A | 6/1933 |
| GB | 150374 | 9/1920 |
| GB | 249675 | 4/1926 |
| GB | 474065 | 1/1936 |
| GB | 757705 | 9/1956 |

OTHER PUBLICATIONS

International Preliminary Report on Patentability dated Feb. 4, 2016, for International Patent Application No. PCT/US2014/047374.
Chinese Office Action dated Aug. 12, 2016, for Chinese Patent Application No. 201480033841.4.
Chinese Office Action dated Aug. 23, 2016, for Chinese Patent Application No. 201480041705.6.
Chinese Office Action dated Apr. 13, 2017, for Chinese Patent Application No. 201480041705.6.
International Search Report and Written Opinion dated Mar. 12, 2015, for International Patent Application No. PCT/US2014/047374.

* cited by examiner

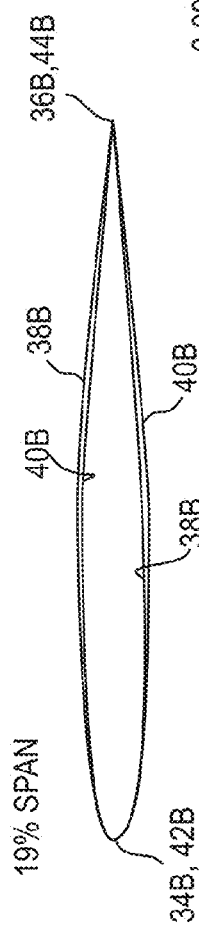
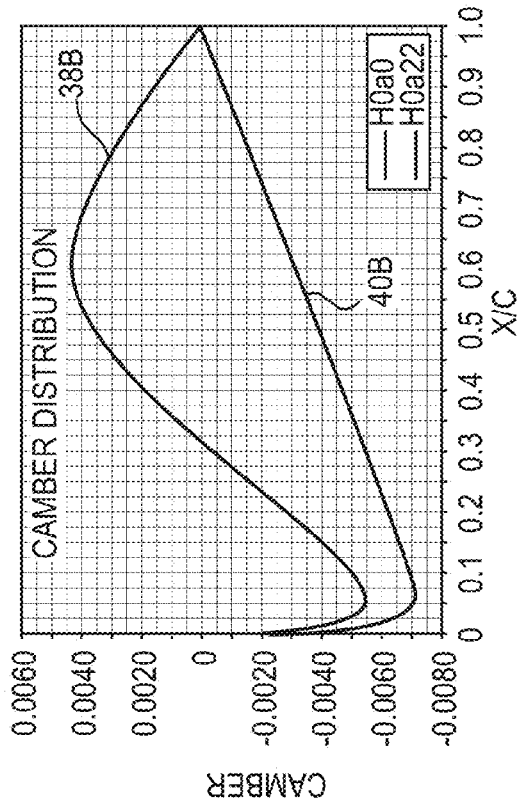
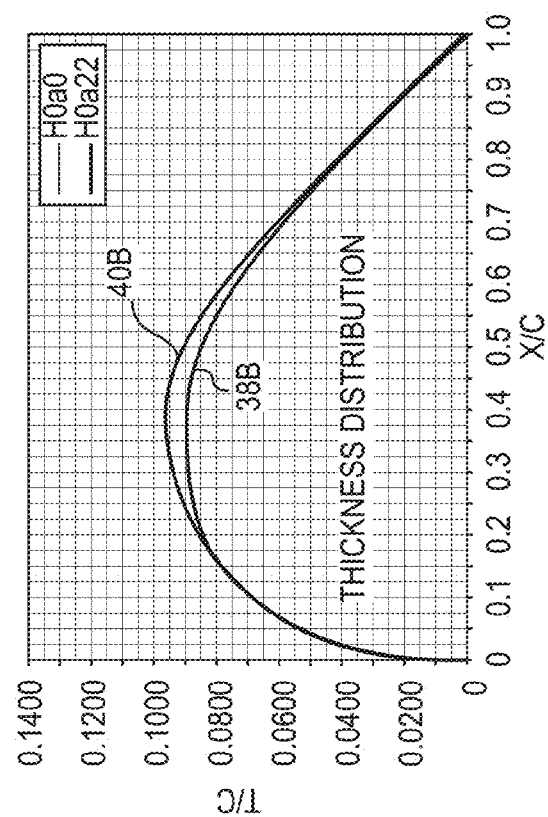
FIG. 6A
FIG. 6B
FIG. 6C

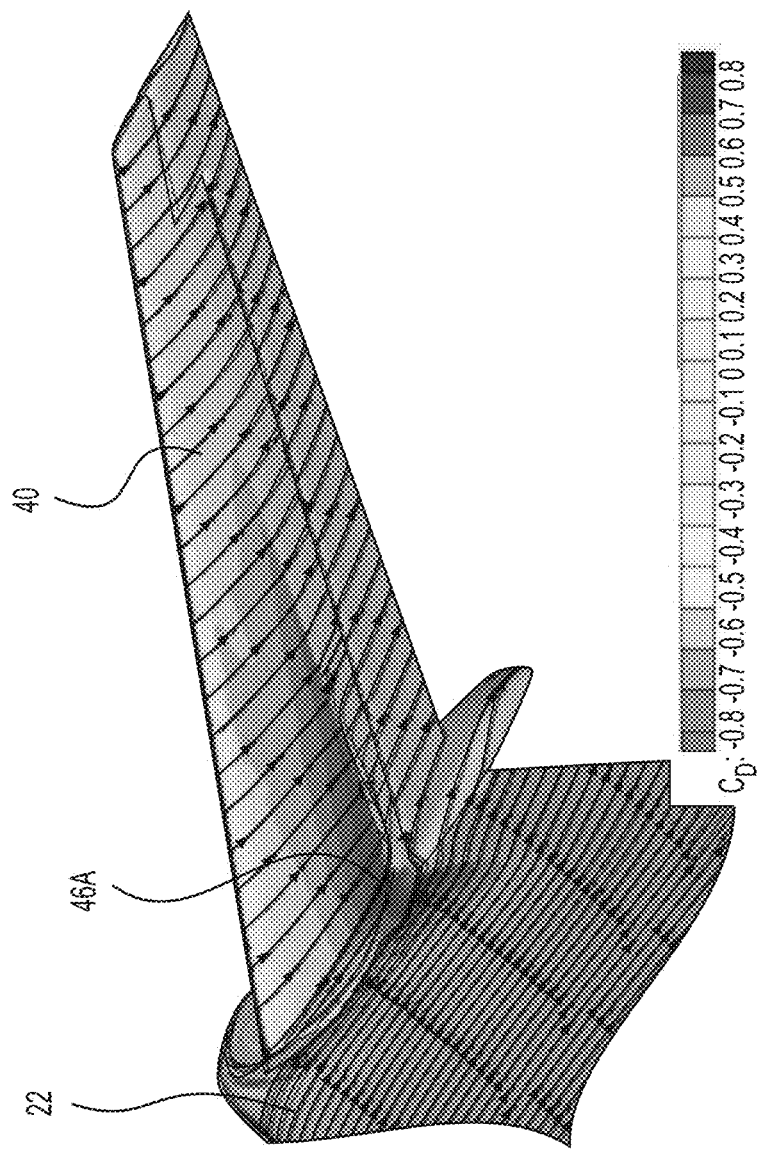

TAILPLANE WITH POSITIVE CAMBER

CROSS-REFERENCE TO RELATED APPLICATIONS

This is a National Stage Entry into the United States Patent and Trademark Office from International PCT Patent Application No. PCT/US2014/047374, having an international filing date of Jul. 21, 2014, which relies for priority on U.S. Provisional Patent Application Ser. No. 61/856,980 entitled "TAILPLANE WITH POSITIVE CAMBER," filed Jul. 22, 2013, the contents of both of which are incorporated herein by reference in their entirety.

TECHNICAL FIELD

The disclosure relates generally to aircraft aerodynamic surfaces and more particularly to tailplanes of aircraft.

BACKGROUND OF THE ART

A tailplane, also known as a horizontal stabilizer, is a relatively small lifting surface located on the tail (empennage) behind the main lifting surfaces of a fixed-wing aircraft as well as other non-fixed-wing aircraft such as helicopters and gyroplanes. The tailplane typically provides stability and control. On many aircraft, the tailplane assembly consists of a fixed surface fitted with a hinged aft surface which is called an elevator. Most airliners and transport aircraft feature a slow-moving trimmable horizontal stabilizer which is combined with one or more independently-moving elevators. The elevators are controlled by the pilot or autopilot and primarily serve to change the aircraft's attitude, while the whole assembly is used to trim (maintaining horizontal static equilibrium) and stabilize the aircraft in the pitch axis.

Conventional tailplanes are typically designed to provide a desired aerodynamic performance during certain phases of flight such as during cruise for example. However, in some flight situations, the flow conditions around tailplanes can render the elevators difficult to use by requiring a large amount of force needed to move the elevators. On aircraft that do not have fly-by-wire systems or other forms of pilot-assist actuation of the elevators, the increased amount of force required to move the elevators under those conditions must be exerted by the pilot and can consequently increase pilot workload.

Improvement is therefore desirable.

SUMMARY

The present disclosure describes devices and assemblies relating to aerodynamic surfaces of aircraft. For example, the disclosure describes a tailplane for a fixed-wing aircraft where at least a portion of the tailplane is positively cambered. In some embodiments, an amount of camber of the tailplane may vary along the span of the tailplane.

In one aspect, the disclosure describes a tailplane of an aircraft. The tailplane may comprise: a stabilizer having a fixed shape; and an elevator movably secured to the stabilizer, the elevator being movable from a neutral position relative to the stabilizer, the stabilizer and the elevator defining an airfoil cross-sectional shape having a positive camber when the elevator is in the neutral position.

In another aspect, the disclosure describes an empennage of an aircraft. The empennage may comprise: an empennage structure; and a horizontal tailplane secured to the empennage structure, the horizontal tail plane including a horizontal stabilizer having a fixed shape and an elevator movably secured to the horizontal stabilizer, the elevator being movable from a neutral position relative to the horizontal stabilizer, the horizontal stabilizer and the elevator defining an airfoil shape having a positive camber in at least one portion of the tailplane when the elevator is in the neutral position.

In a further aspect, the disclosure describes a tailplane of an aircraft. The tailplane may comprise: a stabilizer having a fixed shape; and an elevator movably secured to the stabilizer, the elevator being movable from a neutral position relative to the stabilizer, the stabilizer and the elevator defining an airfoil having an amount of camber that varies along a span of the tailplane when the elevator is in the neutral position.

In other aspects, the disclosure describes aircraft comprising the empennages and/or tailplanes disclosed herein.

In one contemplated embodiment, a tailplane of an aircraft is provided. The tailplane includes a stabilizer having a fixed shape and an elevator movably secured to the stabilizer. The elevator is movable from a neutral position relative to the stabilizer. The stabilizer and the elevator define an airfoil cross-sectional shape having a positive camber when the elevator is in the neutral position.

It is contemplated that an amount of camber of the airfoil cross-sectional shape varies along a span of the tailplane.

In addition, the present invention provides for a positive camber that is greater in an inboard portion of the tailplane than in an outboard portion of the tailplane.

For another contemplated embodiment of the present invention, the inboard portion of the tailplane may be positively cambered and the outboard portion of the tailplane may be negatively cambered.

In one embodiment, the positive camber in at least one portion of the tailplane is at least 0.25% of a corresponding chord length of the airfoil cross-sectional shape.

In another embodiment of the tailplane, a maximum positive camber of the airfoil cross-sectional shape is between 0.25% and 8% of a corresponding chord length of the airfoil cross-sectional shape.

Still further, it is contemplated that a maximum positive camber of the airfoil cross-sectional shape for the tailplane may be between 0.5% and 4% of a corresponding chord length of the airfoil cross-sectional shape.

In another contemplated embodiment of the tailplane, the maximum positive camber of the airfoil cross-sectional shape is located between 30% and 80% of a chord of the airfoil cross-sectional shape from a leading edge of the airfoil cross-sectional shape.

As provided by the present invention, the tailplane may be constructed so that the maximum positive camber of the airfoil cross-sectional shape is located between 40% and 70% of a chord of the airfoil cross-sectional shape from a leading edge of the airfoil cross-sectional shape.

For the tailplane, it is contemplated that the maximum positive camber may be disposed at a root portion of the tailplane adjacent to a structure of the aircraft.

In a further embodiment of the tailplane, an inboard portion may be configured to be secured to a structure of the aircraft and an outboard portion, with an amount of camber of the airfoil shape being different in the inboard portion than in the outboard portion of the tailplane.

For other embodiments of the tailplane, the positive camber of the airfoil shape may be greater in an inboard portion of the tailplane than in an outboard portion of the tailplane.

The present invention also provides for an empennage of an aircraft. The empennage includes an empennage structure and a horizontal tailplane secured to the empennage structure. The horizontal tail plane includes a horizontal stabilizer having a fixed shape and an elevator movably secured to the horizontal stabilizer. The elevator is movable from a neutral position relative to the horizontal stabilizer. The horizontal stabilizer and the elevator define an airfoil shape having a positive camber in at least one portion of the tailplane when the elevator is in the neutral position.

In one embodiment, the present invention provides an empennage where an amount of camber of the airfoil cross-sectional shape varies along a span of the tailplane.

For the empennage of the present invention, it is contemplated that the positive camber may be greater in an inboard portion of the tailplane than in an outboard portion of the tailplane.

For some embodiments of the empennage, the inboard portion of the tailplane may be positively cambered and the outboard portion of the tailplane may be negatively cambered.

For other embodiments of the empennage, a maximum positive camber of the airfoil cross-sectional shape is between 0.25% and 8% of a corresponding chord length of the airfoil cross-sectional shape.

Still further, the empennage may be constructed so that a maximum positive camber of the airfoil cross-sectional shape is between 0.5% and 4% of a corresponding chord length of the airfoil cross-sectional shape.

Alternatively, the empennage may be constructed so that the maximum positive camber of the airfoil cross-sectional shape is located between 30% and 40% of a chord of the airfoil cross-sectional shape from a leading edge of the airfoil cross-sectional shape.

In a further embodiment of the empennage, the maximum positive camber of the airfoil cross-sectional shape is located between 40% and 70% of a chord of the airfoil cross-sectional shape from a leading edge of the airfoil cross-sectional shape.

In another contemplated embodiment, an inboard portion of the tailplane is movably secured to the empennage structure.

In addition, it is contemplated that the empennage structure includes a fin to which a root portion of the horizontal tailplane is secured. The root portion of the horizontal tailplane may be positively cambered in one or more contemplated embodiments.

The present invention also provides a tailplane of an aircraft. The tailplane includes a stabilizer having a fixed shape and an elevator movably secured to the stabilizer. The elevator is movable from a neutral position relative to the stabilizer. The stabilizer and the elevator define an airfoil having an amount of camber that varies along a span of the tailplane when the elevator is in the neutral position.

In one embodiment of the tailplane of the present invention, at least a portion of the airfoil is positively cambered.

As may be apparent from the foregoing, the present invention also encompasses an aircraft including a tailplane, empennage, and any other components and variations described and/or suggested above and described and/or suggested below.

Further details of these and other aspects of the subject matter of this application will be apparent from the detailed description and drawings included below.

DESCRIPTION OF THE DRAWINGS

Reference is now made to the accompanying drawings, in which:

FIGS. 6A-6C respectively show a cross-sectional profile, thickness distribution and a camber distribution at 19% of the span of the tailplane of the empennage of FIG. 2;

FIG. 9A is an axonometric view of a baseline tailplane with an elevator in a neutral position showing a pressure distribution on a lower side of the baseline tailplane during an exemplary flight condition;

DETAILED DESCRIPTION

Aspects of various embodiments are described through reference to the drawings.

Figure 1:
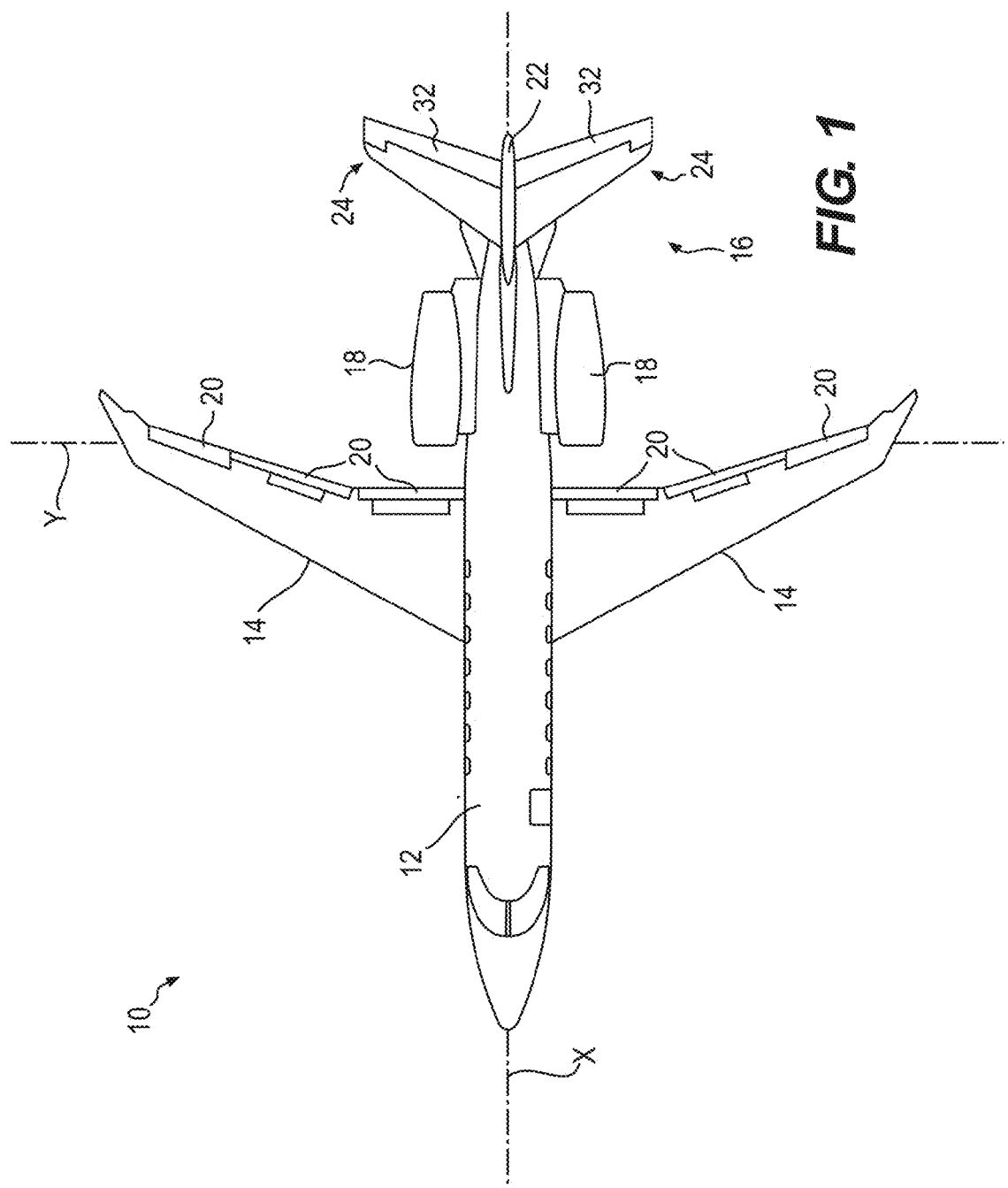
FIG. 1 is a top plan view of an exemplary aircraft.

FIG. 1 illustrates a top plan view of an exemplary aircraft 10 to which various aspects of the present disclosure may be applied. Aircraft 10 may, for example, be a fixed-wing aircraft suitable for subsonic flight. Aircraft 10 may include any suitable aircraft such as corporate, private, commercial or any other type of aircraft. For example, aircraft 10 may be a twin engine business jet. In various embodiments, aircraft 10 may comprise fuselage 12, wings 14, empennage 16 (e.g., tail assembly), one or more engines 18. Engines 18 may be mounted to a portion of fuselage 12 and/or may be wing-mounted depending on the specific configuration of aircraft 10. In various embodiments of aircraft 10, wings 14 may serve as the main lifting surfaces of aircraft 10. Wings 14 may comprise one or more movable flight control surfaces 20. Flight control surfaces 20 may, for example, include one or more flaps, slats, spoilers, ailerons, airbrakes and/or other types flight control surfaces. Empennage 16, may comprise one or more fins 22 (e.g., vertical stabilizers) and one or more tailplanes 24 (e.g., horizontal stabilizers). As shown in FIG. 1, the longitudinal axis of aircraft 10 is referenced as X, the lateral axis of aircraft 10 is referenced as Y and the vertical axis (see FIG. 2) of aircraft 10 is referenced as Z and is orthogonal to the X and Y axes.

Figure 2:
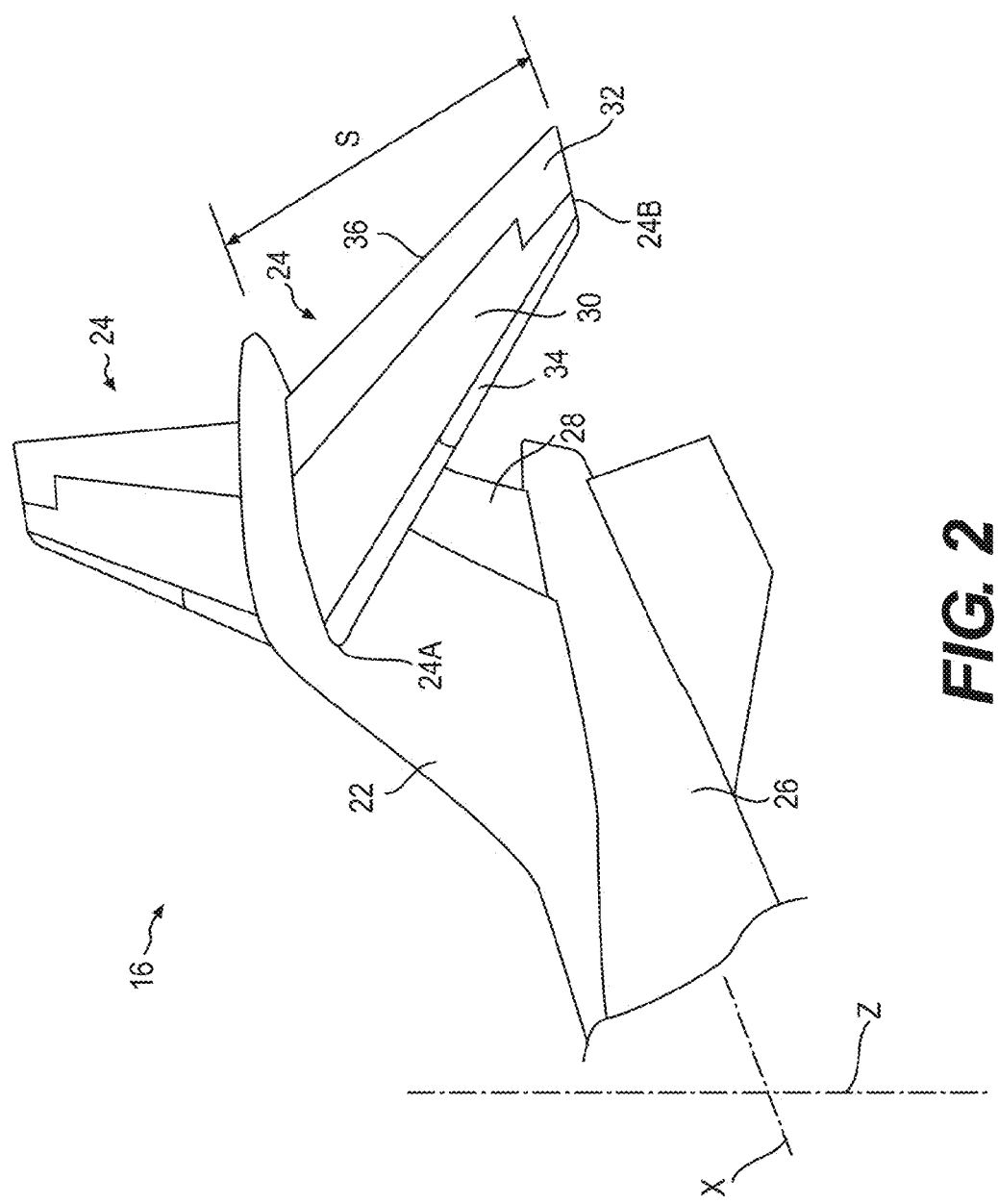
FIG. 2 is an axonometric view of an empennage of the aircraft of FIG. 1.

FIG. 2 is an axonometric view of empennage 16 of aircraft 10. Empennage 16 may be disposed behind (e.g., aft of) wings 14 and comprise a generally T-tail configuration. However it is understood that various aspects of the present disclosure could be applied to other configurations of empennages including, for example a cruciform configuration or other configurations where fin(s) 22 and/or tailplane(s) 24 may each be directly secured to tail boom 26. In FIG. 2, fin 22 is shown as being secured to tail boom 26. Fin 22 may comprise one or more movable rudders 28 or other flight control surface(s) which may allow a pilot to control yaw movement (e.g., about the vertical axis Z) of aircraft 10.

One or more tailplanes 24 may be secured to each lateral side of fin 22. Tailplane 24 may, in various embodiments, comprise lifting surface(s) that may provide stability and/or control. In the exemplary T-tail configuration shown in FIG. 2, tailplanes 24 are shown to be secured to a relatively high portion of fin 22 however it is understood that in various empennage configurations, tailplanes 24 may be secured to lower portions of fin 22 and/or may be secured directly to tail boom 26 or other aircraft/empennage structures. In various embodiments, tailplanes 24 may be movably (e.g., pivotally) or otherwise secured to empennage structure (e.g., fin 22 and/or tail boom 26). For example, tailplanes 24 may be adjustable (i.e., trimmable) and may be adjusted to maintain horizontal equilibrium and stabilize aircraft 10 in the pitch axis (e.g., about the lateral axis Y). In various embodiments, tailplanes 24 may help adjust for changes in the center of lift and center of gravity caused by, for example, changes in speed and attitude or when fuel is burned off.

While portions of the following description may refer to tailplane 24 in the singular, it is understood that empennage 16 may, in various embodiments, comprise a plurality of tailplanes 24 which may or may not have a configuration as described below. For the purpose of the present disclosure, tailplane 24 may span between root 24A disposed in an inboard portion of tailplane 24 and tip 24B disposed in an outboard portion of tailplane 24. Root 24A may be disposed proximate and/or may be secured to empennage structure (e.g., fin 22) and tip 24B may be disposed relatively distally (e.g., outboard) from empennage structure (e.g., fin 22). Root 24A may be a portion of tailplane 24 which substantially intersects fin 22 or other aircraft/empennage structure(s). The span S of tailplane 24 is illustrated in FIG. 2.

Tailplane 24 may comprise one or more fixed horizontal stabilizers 30 and one or more movable (e.g., hinged) elevators 32 movably secured to horizontal stabilizer(s) 30. Horizontal stabilizer 30 may comprise leading (i.e., forward) edge 34 and may have a substantially fixed (i.e., non-variable) configuration or shape. For example, the construction of horizontal stabilizer 30 may be substantially rigid and define a fixed (i.e., non-variable) shape. Horizontal stabilizer 30 may comprise a portion of tailplane 24 that is in front of elevator 32.

Tailplane 24 may be constructed according to conventional or other methods. For example, horizontal stabilizer 30 may include a substantially rigid skin comprising a composite material supported by one or more structural members such as rib(s) and spar(s) (not shown). Portions of leading edge 34 may comprise a metallic material and may also include de-icing capabilities. Elevator 32 may be disposed in or define at least a portion of trailing edge 36 (i.e., aft portion) of tailplane 24. Elevator 32 may be constructed according to known or other methods and may comprise composite and/or metallic material(s). Elevator 32 may also have a fixed (i.e., non-variable) configuration or shape and may be deflectable upwardly and downwardly within a suitable range from a neutral position. Elevators 32 may be controlled by a pilot or an auto-flight system (e.g., autopilot) of aircraft 10 and may primarily serve to change the attitude of aircraft 10, while the whole assembly (tailplane 24) may be trimmable and used to trim (i.e., maintain horizontal static equilibrium) and stabilize aircraft 10 in the pitch axis. When elevator 32 is in the neutral position, horizontal stabilizer 30 and elevator 32 may together define an airfoil cross-sectional shape which is described in detail below.

The exemplary tailplane 24, including horizontal stabilizer 30, may be illustrated herein as extending substantially horizontally (i.e., in the X-Y plane). However, it is understood that tailplane 24 could be oriented differently than what is shown herein. For example, various aspects of the present disclosure could apply to tailplanes that are not oriented exactly horizontally. In the present disclosure, the term "horizontal" is intended to cover orientations that are not necessarily exactly horizontal. For example, the term "horizontal stabilizer" is intended to encompass stabilizing surfaces or members that may provide some horizontal stability even though such surfaces or members may not necessarily be oriented horizontally.

It is common for conventional tailplanes to have cross-sectional shapes that are substantially symmetrical. In some applications, conventional tailplanes can have a cross-sectional shape that is negatively cambered (i.e., comprise a reverse camber). Such symmetrical or negatively cambered airfoil shapes for tailplanes are typically selected or designed to achieve a desired performance during various phases of flight. For example, in some conventional applications, it can be desirable for a tailplane to have a negatively cambered airfoil shape to produce a downward lifting force at the tailplane.

However, it has been found that during certain flight situations, the shape of conventional tailplanes can render the elevators that are movably attached thereto, either difficult to use or in some cases practically unusable. The flow conditions around symmetrical or negatively cambered tailplanes and the associated pressure distributions surrounding such tailplanes can result in a substantial increase in the force (e.g., hinge moment) required to move the elevators. This can be of particular importance for aircraft which do not have fly-by-wire systems or other pilot-assist actuation systems for moving the elevators. In such cases, the increased force required to move the elevators must be exerted by the pilot via the control column (not shown) and can significantly increase pilot workload. Alternatively, for aircraft that comprise hydraulic, electric or other types of actuation systems, such systems must be adequately designed and sized to overcome such increased force. As will be explained in detail below, during a dive where the speed of an aircraft is relatively high, local flow velocities under a conventional symmetrical or negatively cambered tailplane can reach transonic or even supersonic speeds and develop a shock (e.g., local area of suction/negative pressure) under the tailplane near or under the elevator. This phenomenon can results in an increased amount of force being required to deflect the elevator upwardly in order to pull up from a dive condition.

FIGS. 3A-3D show exemplary cross-sectional profiles of tailplane 24 of empennage 16 taken at different positions along the span S of tailplane 24. The span S may extend between root 24A (i.e., 0% span) and tip 24B (100% span). Contrary to conventional tailplanes, at least a portion of tailplane 24 may be positively cambered. In various embodiments, the positive camber of tailplane 24 may alter the flow conditions around tailplane 24 in comparison with conventional (symmetric or negatively cambered) tailplane shapes and may result in a reduction, in some embodiments, in the amount of force required to deflect elevator 32 upwardly to pull up from a dive condition.

Stabilizer 30 and elevator 32 of tailplane 24 of the present disclosure may together define airfoil cross-sectional shape 38 (see exemplary profiles 38A-38D in FIGS. 3A-3D respectively). At least a portion of airfoil shape 38 may be positively cambered when elevator 32 is in the neutral (i.e., non-deflected) position. References made herein to positive and negative camber of airfoil shapes will be apparent to those skilled in the relevant arts. For example, airfoil camber may be understood as the asymmetry between the top and the bottom surfaces of an airfoil. In the present disclosure, the top and bottom surfaces of tailplane 24 may be defined in relation to vertical axis Z and the cross-sectional shapes 38 shown in FIGS. 3A-3D may be taken in the X-Z plane (i.e., substantially parallel to a streamwise direction).

Figure 12:
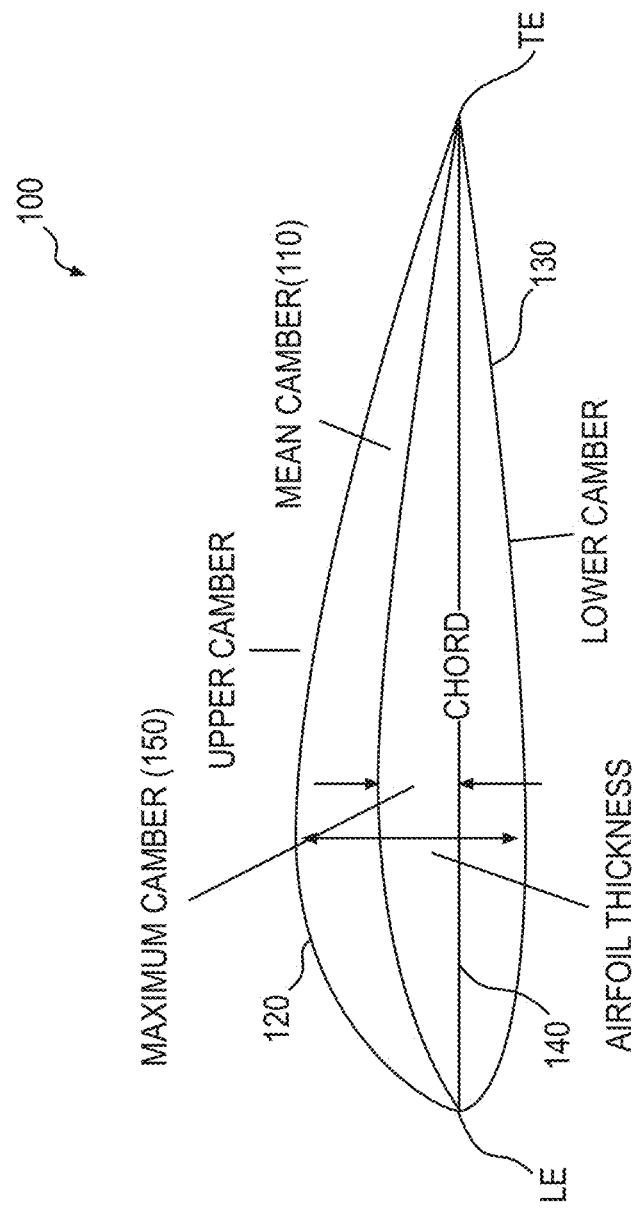
FIG. 12 shows a cross-sectional profile of a typical positively cambered airfoil.

FIG. 12 shows a cross-sectional profile 100 of a typical positively cambered airfoil for illustration purpose only. The camber of the airfoil may be illustrated by mean camber line 110 extending between the leading edge LE and the trailing edge TE of the airfoil and midway between the upper surface 120 and the lower surface 130. The shape of mean camber line 110 can depend on how the thickness of such airfoil is defined. An airfoil that is positively cambered may comprise a mean camber line 110 that deviates upwardly relative to the chord 140 of the airfoil (as shown in FIG. 12) and an airfoil that is negatively cambered may comprise a mean camber line 110 that deviates downwardly relative to the chord of the airfoil. In other words, where the mean camber line 110 lies above the chord 140, the airfoil is said to have a positive camber. Maximum camber 150 is a ratio of maximum distance between the camber line 110 to the chord length. An airfoil that is not cambered is typically referred to as a symmetric airfoil.

In reference again to FIGS. 3A-3D, four cross-sectional shapes (i.e., profiles) 38A-38D of tailplane 24 taken at root 24A (FIG. 3A), 19% span (FIG. 3B), 33% span (FIG. 3C) and at tip 24B (FIG. 3D) of tailplane 24 respectively are shown. As shown, the amount of camber of tailplane 24 may vary along span S. For example, the amount of positive camber may be greater at an inboard portion of tailplane 24 than at an outboard portion of tailplane 24. For example, the amount of positive camber may be greatest at root 24A and may diminish toward tip 24B. In FIGS. 3A-3D, cross-sectional shapes 38A-38D are superimposed over corresponding baseline cross-sectional shapes 40A-40D for comparison purpose. Baseline cross-sectional shapes 40A-40D may be representative of a conventional tailplane shape which may be negatively cambered. Even though tailplane 24 as a whole may have a shape that is modified from conventional tailplanes, it is understood that, in various embodiments, one or more portions of tailplane 24 in accordance with the present disclosure may be functionally similar to or substantially identical to one or more corresponding portions of a conventional tailplane. Accordingly, one or more cross-sectional shapes 38A-38D may, in some embodiments, be similar or substantially identical to one or more corresponding baseline cross-sectional shapes 40A-40D.

Figure 3:
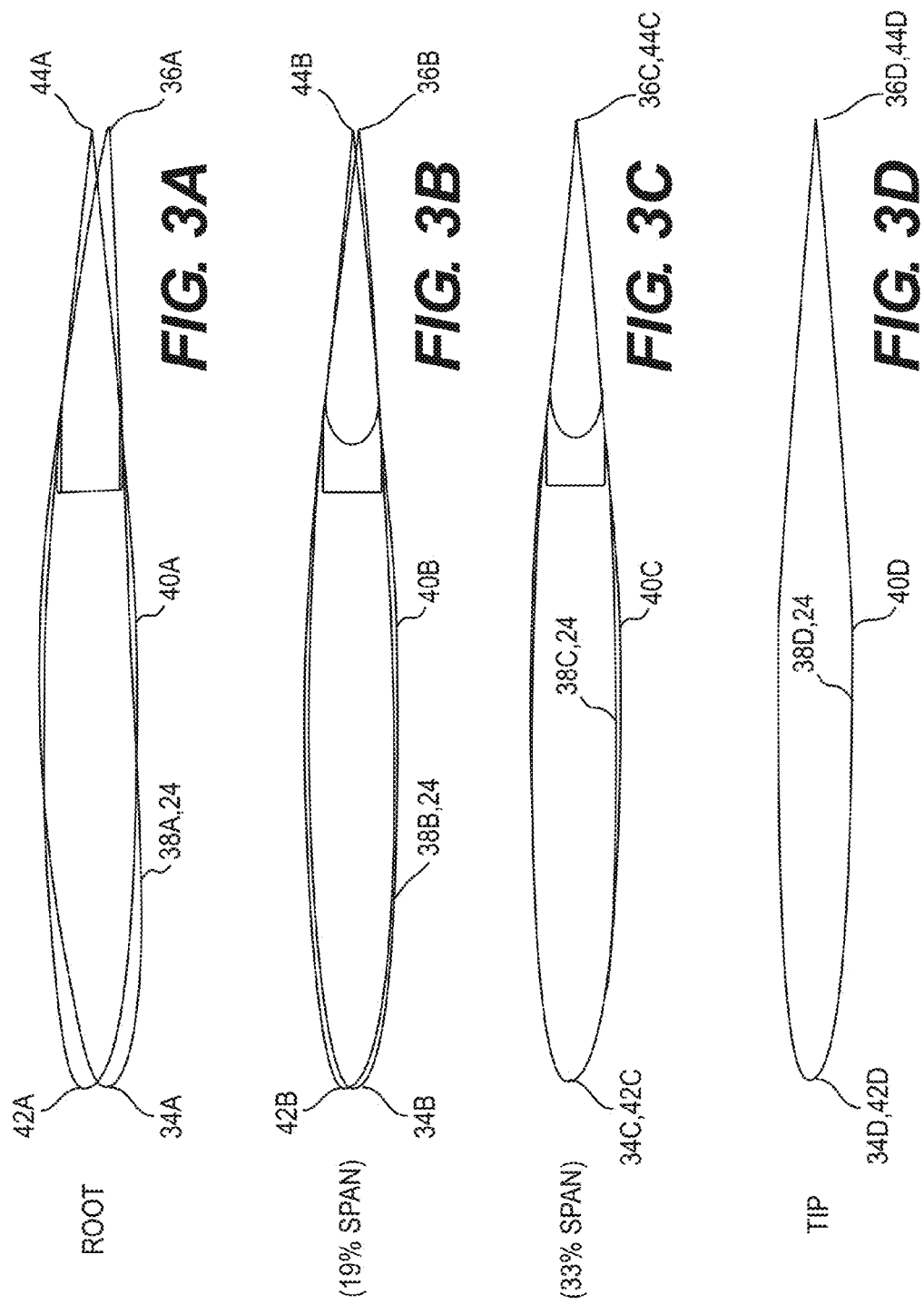
FIGS. 3A-3D show cross-sectional profiles of a tailplane of the empennage of FIG. 2 taken at different positions along a span of the tailplane.

FIG. 3A shows that, at root 24A, leading edge 34A and trailing edge 36A of cross-sectional shape 38A may droop downwardly relative to leading edge 42A and trailing edge 44A respectively of baseline cross-sectional shape 40A. FIG. 3B shows that, at 19% of span S, leading edge 34B and trailing edge 36B of cross-sectional shape 38B may also droop downwardly relative to leading edge 42B and trailing edge 44B respectively of baseline cross-sectional shape 40B but the amount of downward droop at 19% span may be less than at root 24A. FIGS. 3C and 3D show that leading edges 34C, 34D and trailing edges 36C, 36D of cross-sectional shapes 38C, 38D may not significantly droop downwardly relative to leading edges 42C, 42D and trailing edges 44C, 44D respectively of corresponding baseline cross-sectional shapes 40C, 40D. Accordingly, the exemplary cross-sectional shapes 38A-38D of FIGS. 3A-3D show that, in some embodiments in accordance with the present disclosure, the amount of camber may vary along the span S of tailplane 24. In other words, airfoil cross-sectional shape 38 may not be uniform along span S of tailplane 24.

The outer shape of tailplane 24, including the varying camber distribution along the span S, may comprise a lofted surface defined by a number of cross-sectional profiles (e.g., 38A-38D) at selected positions along the span S. In various embodiments, the lofting may be substantially linear, non-linear or combinations thereof. For example, the lofting of one or more surfaces defining the shape of tailplane 24 may be done via computer-aided design (CAD) techniques using one or more guide curves in addition to the plurality of profiles 38A-38D.

Figure 4:
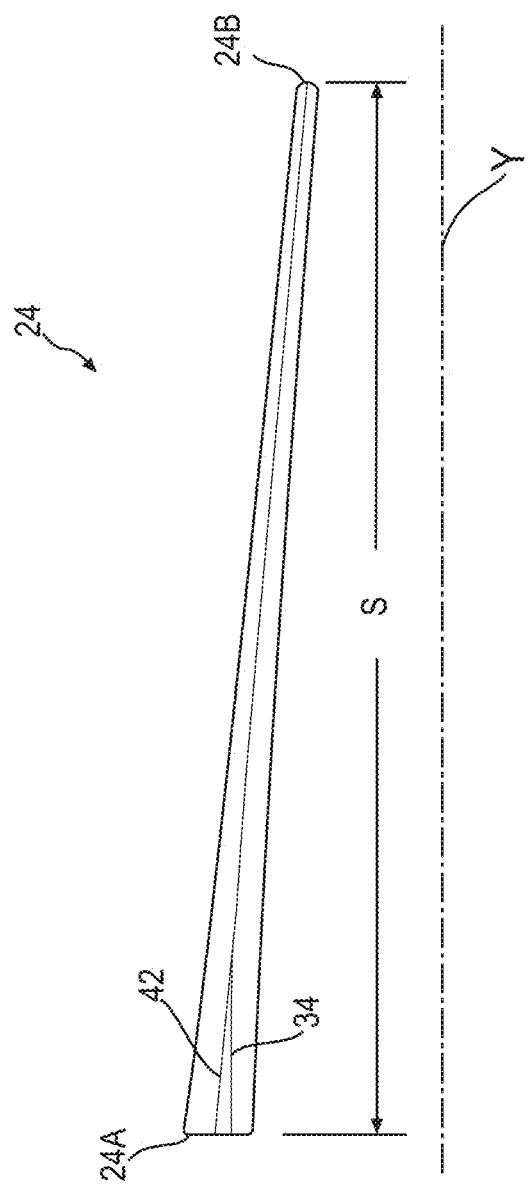
FIG. 4 shows a front elevation view of the tailplane of the empennage of FIG. 2.

FIG. 4 shows a front elevation view of tailplane 24 of empennage 16. Leading edge 34 of tailplane 24 is plotted against leading edge 42 of baseline tailplane 40 (i.e., defined by baseline cross-sectional profiles 40A-40D). Leading edge 34 is shown to droop downwardly relative to baseline leading edge 42 in at least one portion of tailplane 24. FIG. 4 shows that the downward droop of leading edge 34 may vary along the span S of tailplane 24. Consequently, the camber of tailplane 24 may also vary along the span S of tailplane 24. FIG. 4 also shows that the amount of downward droop of leading edge 34 may be greater at an inboard portion of tailplane 24 than at an outboard portion of tailplane 24. For example, the amount of downward droop of leading edge 34 and also trailing edge 36 (not shown in FIG. 4) may be greatest at root 24A of tailplane 24. FIG. 4 also shows that tailplane 24 may not be exactly parallel to lateral axis Y. In other words, even though tailplane 24 may provide some horizontal stability for aircraft 10, tailplane 24 may not necessarily be exactly horizontal.

Figure 5C:
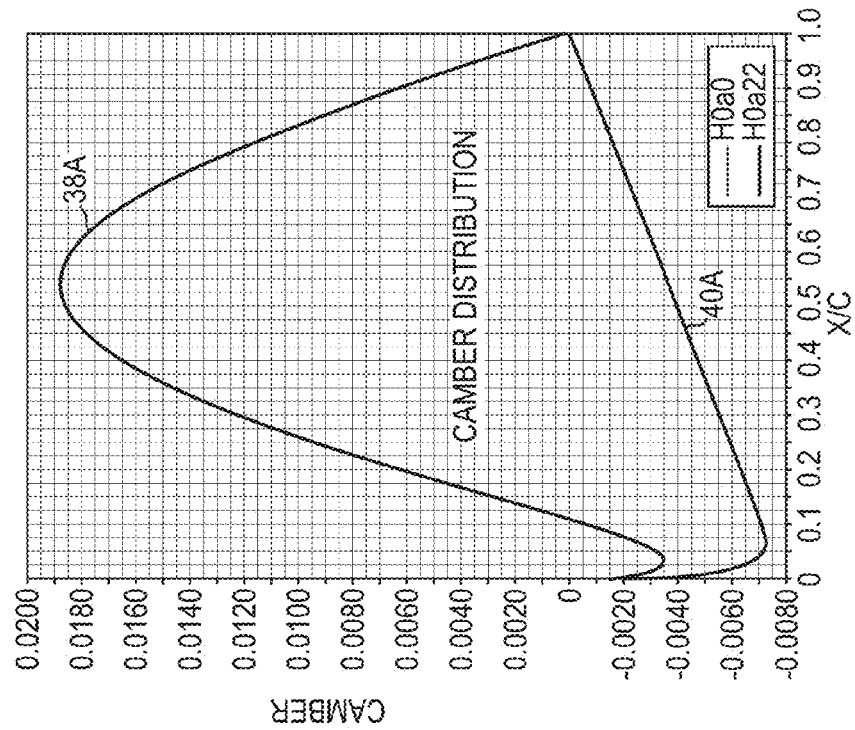
FIGS. 5A-5C respectively show a cross-sectional profile, thickness distribution and a camber distribution at a root of the tailplane of the empennage of FIG. 2.
Figure 5A:
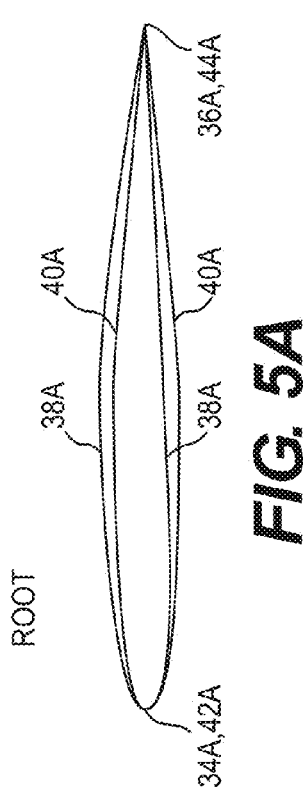
Figure 5B:
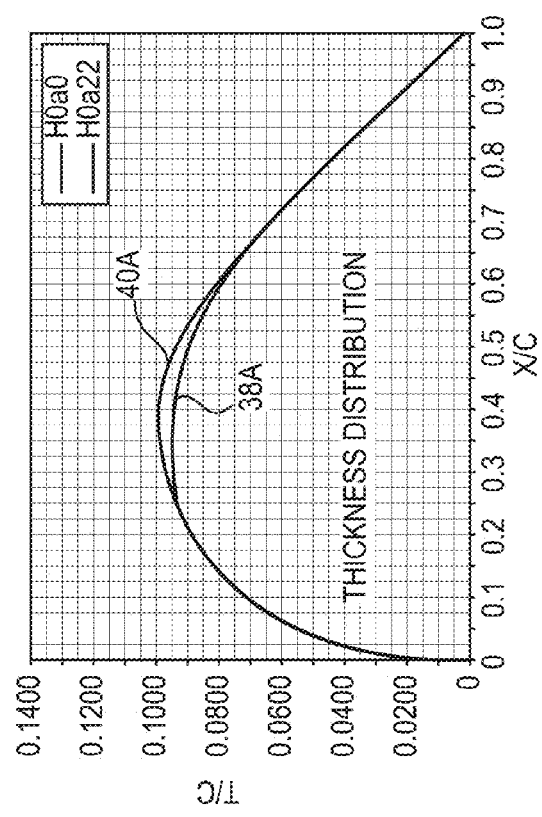

FIGS. 5A-5C respectively show: airfoil cross-sectional shape 38A (i.e., at root 24A of tailplane 24) superimposed over baseline cross-sectional shape 40A; a comparison of the thickness distribution between airfoil cross-sectional shape 38A and baseline cross-sectional shape 40A; and, a comparison of the camber distribution between airfoil cross-sectional shape 38A and baseline cross-sectional shape 40A. Unlike the superimposition of cross-sectional shapes shown in FIG. 3A, airfoil cross-sectional shape 38A and baseline cross-sectional shape 40A of FIG. 5A are positioned to have coinciding leading edges 34A, 42A and also to have coinciding trailing edges 36A and 44A and thereby provide another illustration of the difference in thickness and camber between cross-sectional shape 38A and baseline cross-sectional shape 40A. One skilled in the relevant arts will appreciate that the numerical values presented in plots of FIGS. 5B and 5C are exemplary only and that variations may be made from the exact values shown depending on the FIG. 5B shows a plot representative of the thickness of cross-sectional shapes 38A, 40A plotted against the position along the respective chords of cross-sectional shapes 38A, 40A respectively. The values along the ordinate (i.e., y-axis) of the plot are expressed as the ratio of the thickness over the chord length. The values along the abscissa (i.e., x-axis) of the plot are expressed as normalized values of the position along the respective chords (i.e., the distance from the leading edge over the chord length). As shown in FIG. 5B, cross-sectional shape 38A may have a maximum thickness that is about 9.5% of the chord length and which may be located at about 35% of the chord length from leading edge 34A. In various embodiments, the maximum thickness of cross-sectional shape 38A may be located between about 30% and about 40% of the chord length from leading edge 34A.

FIG. 5C shows a plot representative of the amount of camber of cross-sectional shapes 38A, 40A plotted against the position along the respective chords of cross-sectional shapes 38A, 40A. The values along the ordinate (i.e., y-axis) of the plot are expressed as the ratio of the deviation of a mean camber line from the chord over the chord length. The values along the abscissa (i.e., x-axis) of the plot are expressed as normalized values of the position along the respective chords (i.e., the distance from the leading edge over the chord length). As shown, in FIG. 5C, some of cross-sectional shape 38A may be positively cambered. Specifically, cross-sectional shape 38A may have a maximum amount of camber of about 1.88% of the chord length and which may be located at about 55% of the chord length from leading edge 34A. As shown in FIG. 5C, cross-sectional shape 38A may also comprise a portion which is negatively cambered.

FIGS. 6A-6C respectively show: airfoil cross-sectional shape 38B (i.e., at 19% of span S of tailplane 24) superimposed over baseline cross-sectional shape 40B; a comparison of the thickness distribution between airfoil cross-sectional shape 38B and baseline cross-sectional shape 40B; and, a comparison of the camber distribution between airfoil cross-sectional shape 38B and baseline cross-sectional shape 40B. Unlike the superimposition of cross-sectional shapes shown in FIG. 3B, airfoil cross-sectional shape 38B and baseline cross-sectional shape 40B of FIG. 6A are positioned to have coinciding leading edges 34B, 42B and also to have coinciding trailing edges 36B and 44B and thereby provide another illustration of the difference in thickness and camber between cross-sectional shape 38B and baseline cross-sectional shape 40B. One skilled in the relevant arts will appreciate that the numerical values presented in plots of FIGS. 6B and 6C are exemplary only and that variations may be made from the exact values shown depending on the specific applications or conditions. Such variations are intended to fall within the scope of the present disclosure.

FIG. 6B shows a plot representative of the thickness of cross-sectional shapes 38B, 40B plotted against the position along the respective chords of cross-sectional shapes 38B, 40B respectively. The values along the ordinate (i.e., y-axis) of the plot are expressed as the ratio of the thickness over the chord length. The values along the abscissa (i.e., x-axis) of the plot are expressed as normalized values of the position along the respective chords (i.e., the distance from the leading edge over the chord length). As shown in FIG. 6B, cross-sectional shape 38B may have a maximum thickness that is about 9% of the chord length and which may be located at about 35% of the chord length from leading edge 34B. In various embodiments, the maximum thickness of cross-sectional shape 38B may be located between about 30% and about 40% of the chord length from leading edge 34B.

FIG. 6C shows a plot representative of the amount of camber of cross-sectional shapes 38B, 40B plotted against the position along the respective chords of cross-sectional shapes 38B, 40B. The values along the ordinate (i.e., y-axis) of the plot are expressed as the ratio of the deviation of a mean camber line from the chord over the chord length. The values along the abscissa (i.e., x-axis) of the plot are expressed as normalized values of the position along the respective chords (i.e., the distance from the leading edge over the chord length). As shown, in FIG. 6C, some of cross-sectional shape 38B may be positively cambered. Specifically, cross-sectional shape 38B may have a maximum amount of camber of about 0.43% of the chord length and which may be located at about 60% of the chord length from leading edge 34B. As shown in FIG. 6C, cross-sectional shape 38C may also comprise a portion which is negatively cambered.

Figure 7A:
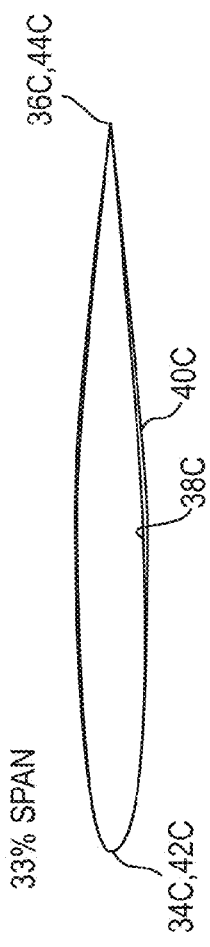
FIGS. 7A-7C respectively show a cross-sectional profile, thickness distribution and a camber distribution at 33% of the span of the tailplane of the empennage of FIG. 2.
Figure 7C:
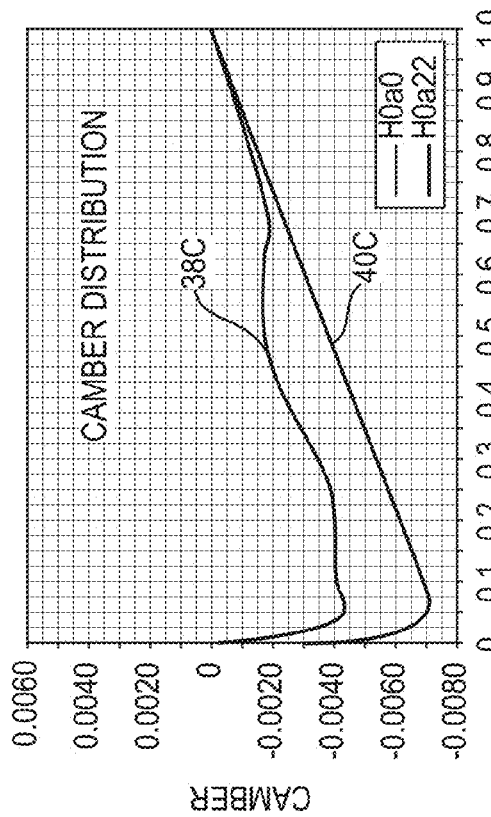
Figure 7B:
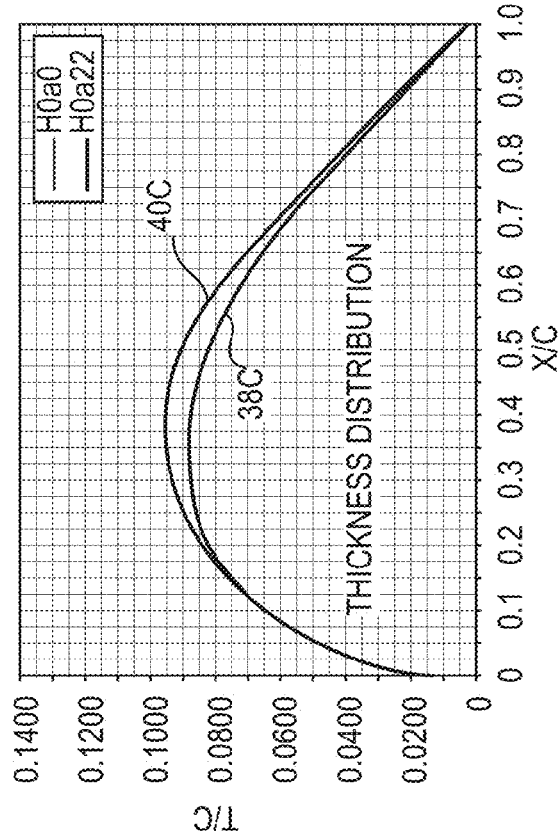

FIGS. 7A-7C respectively show: airfoil cross-sectional shape 38C (i.e., at 33% of span S of tailplane 24) superimposed over baseline cross-sectional shape 40C; a comparison of the thickness distribution between airfoil cross-sectional shape 38C and baseline cross-sectional shape 40C; and, a comparison of the camber distribution between airfoil cross-sectional shape 38C and baseline cross-sectional shape 40C. Unlike the superimposition of cross-sectional shapes shown in FIG. 3C, airfoil cross-sectional shape 38C and baseline cross-sectional shape 40C of FIG. 7A are positioned to have coinciding leading edges 34C, 42C and also to have coinciding trailing edges 36C and 44C and thereby provide another illustration of the difference in thickness and camber between cross-sectional shape 38C and baseline cross-sectional shape 40C. One skilled in the relevant arts will appreciate that the numerical values presented in plots of FIGS. 7B and 7C are exemplary only and that variations may be made from the exact values shown depending on the specific applications or conditions. Such variations are intended to fall within the scope of the present disclosure.

FIG. 7B shows a plot representative of the thickness of cross-sectional shapes 38C, 40C plotted against the position along the respective chords of cross-sectional shapes 38C, 40C respectively. The values along the ordinate (i.e., y-axis) of the plot are expressed as the ratio of the thickness over the chord length. The values along the abscissa (i.e., x-axis) of the plot are expressed as normalized values of the position along the respective chords (i.e., the distance from the leading edge over the chord length). As shown in FIG. 7B, cross-sectional shape 38C may have a maximum thickness that is about 8.8% of the chord length and which may be located at about 35% of the chord length from leading edge 34C. In various embodiments, the maximum thickness of cross-sectional shape 38C may be located between about 30% and about 40% of the chord length from leading edge 34C.

FIG. 7C shows a plot representative of the amount of camber of cross-sectional shapes 38C, 40C plotted against the position along the respective chords of cross-sectional shapes 38C, 40C. The values along the ordinate (i.e., y-axis) are of the plot are expressed as the ratio of the deviation of a mean camber line from the chord over the chord length. The values along the abscissa (i.e., x-axis) of the plot are expressed as normalized values of the position along the respective chords (i.e., the distance from the leading edge over the chord length). As shown, in FIG. 7C, this portion of tailplane 24 may not be positively cambered. Specifically, cross-sectional shape 38C may have a maximum amount of negative camber of about 0.43% of the chord length and which may be located at about 5.2% of the chord length from leading edge 34C.

Figure 8A:
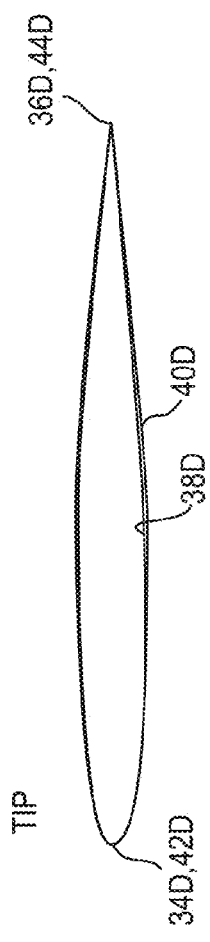
FIGS. 8A-8C respectively show a cross-sectional profile, thickness distribution and a camber distribution at a tip of the tailplane of the empennage of FIG. 2.
Figure 8C:
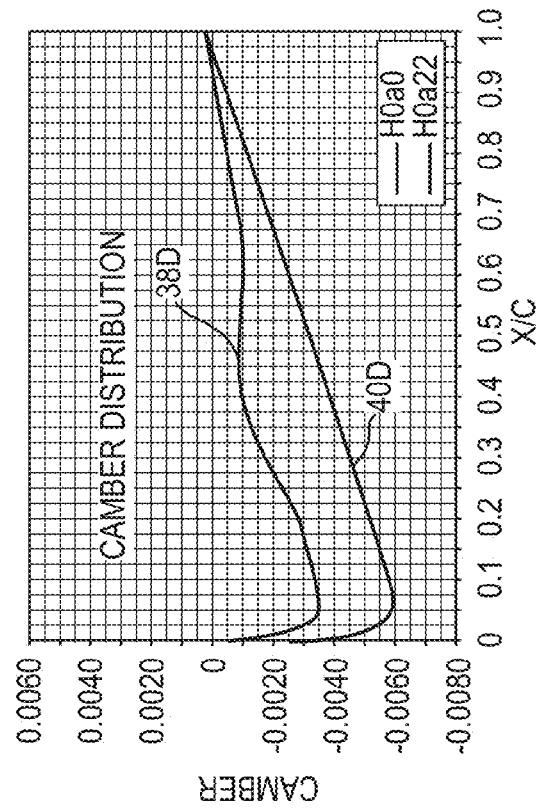
Figure 8B:
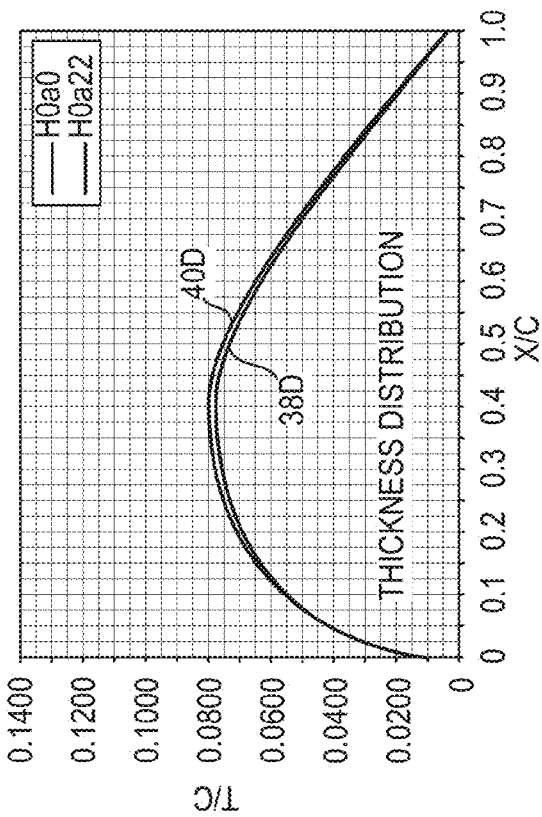

FIGS. 8A-8C respectively show: airfoil cross-sectional shape 38D (i.e., at tip 24B of tailplane 24) superimposed over baseline cross-sectional shape 40D; a comparison of the thickness distribution between airfoil cross-sectional shape 38D and baseline cross-sectional shape 40D; and, a comparison of the camber distribution between airfoil cross-sectional shape 38D and baseline cross-sectional shape 40D. Airfoil cross-sectional shape 38D and baseline cross-sectional shape 40D of FIG. 8A are positioned to have coinciding leading edges 34D, 42D and also to have coinciding trailing edges 36D and 44D and thereby provide another illustration of the difference in thickness and camber between cross-sectional shape 38D and baseline cross-sectional shape 40D. One skilled in the relevant arts will appreciate that the numerical values presented in plots of FIGS. 8B and 8C are exemplary only and that variations may be made from the exact values shown depending on the specific applications or conditions. Such variations are intended to fall within the scope of the present disclosure.

FIG. 8B shows a plot representative of the thickness of cross-sectional shapes 38D, 40D plotted against the position along the respective chords of cross-sectional shapes 38D, 40D respectively. The values along the ordinate (i.e., y-axis) of the plot are expressed as the ratio of the thickness over the chord length. The values along the abscissa (i.e., x-axis) of the plot are expressed as normalized values of the position along the respective chords (i.e., the distance from the leading edge over the chord length). As shown in FIG. 8B, cross-sectional shape 38D may have a maximum thickness that is about 7.8% of the chord length and which may be located at about 38% of the chord length from leading edge 34D. In various embodiments, the maximum thickness of cross-sectional shape 38D may be located between about 30% and about 40% of the chord length from leading edge 34D.

FIG. 8C shows a plot representative of the amount of camber of cross-sectional shapes 38D, 40D plotted against the position along the respective chords of cross-sectional shapes 38D, 40D. The values along the ordinate (i.e., y-axis) are of the plot are expressed as the ratio of the deviation of a mean camber line from the chord over the chord length. The values along the abscissa (i.e., x-axis) of the plot are expressed as normalized values of the position along the respective chords (i.e., the distance from the leading edge over the chord length). As shown, in FIG. 8C, this portion of tailplane 24 may not be positively cambered. Specifically, cross-sectional shape 38D may have a maximum amount of negative camber of about 0.35% of the chord length and which may be located at about 5.2% of the chord length from leading edge 34D.

As shown in FIGS. 5A-5C to FIGS. 8A-8C, the amount of positive camber may be greater at an inboard portion of tailplane 24 than at an outboard portion of tailplane 24. In various embodiments, the distribution of camber along span S of tailplane 24 may be selected to achieve desired flow characteristics in selected portions of tailplane 24. Positive camber may be applied locally to one or more portions of tailplane 24. For example, while one or more portions of tailplane 24 may be positively cambered, other portions may be symmetric or negatively cambered. As explained below, the presence of fin 22 adjacent to tailplane 24 may influence fluid flow around tailplane 24 mainly at an inboard portion of tailplane 24 and, in certain circumstances, a greater amount of positive camber may be desired in the inboard portion of tailplane 24 relative to other more outboard portions of tailplane 24 to compensate for such influence from fin 22.

In various embodiments, it may be desirable to have tailplane 24 comprising an amount of camber that varies in sign (e.g., positive/negative) and/or in magnitude along the span S to achieve desired flow characteristics. For example, in some embodiments, tailplane 24 may or may not comprise a positively cambered portion but may comprise at least a portion which is negatively cambered where the magnitude of the negative camber varies along the span S.

One skilled in the relevant arts will appreciate that the numerical values presented in plots of FIGS. 5B, 5C, 6B, 6C, 7B, 7C, 8B and 8C are exemplary only and that variations may be made from the exact values shown depending on the specific applications or conditions. Such variations are intended to fall within the scope of the present disclosure. For example, in various embodiments, the amount of positive camber in at least a portion of tailplane 24 may be about 0.25% or more of the chord length. In various embodiments, the maximum amount of positive camber in at least a portion of tailplane 24 may be between about 0.25% of the chord length and about 8% of the chord length. In some embodiments, the maximum amount of positive camber in at least a portion of tailplane 24 may be between about 0.5% of the chord length and about 4% of the chord length. In various embodiments, the maximum amount of positive camber may be located between about 30% and about 80% of the chord length from leading edge 34. In some embodiments, the maximum amount of positive camber may be located between about 40% and about 70% of the chord length from leading edge 34.

Figure 9B:
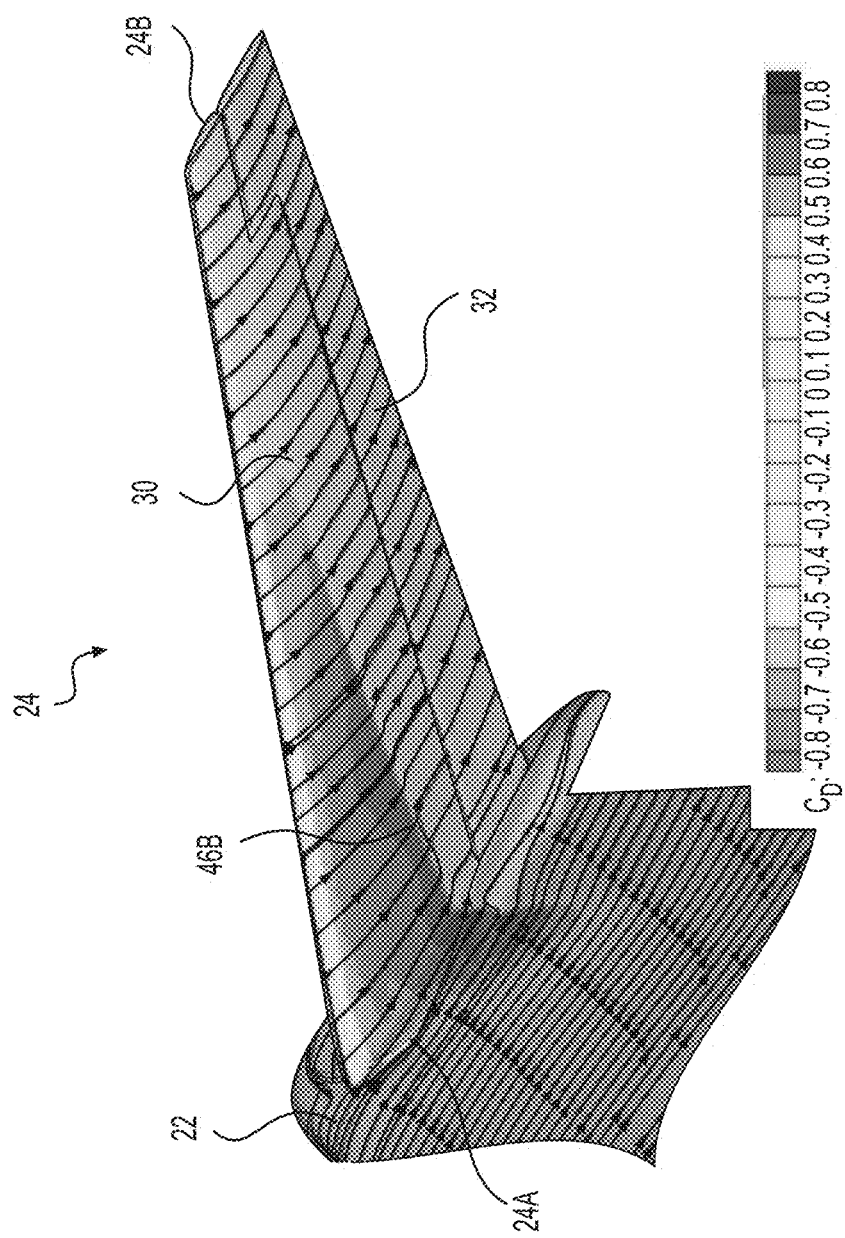
FIG. 9B is an axonometric view of the tailplane of the empennage of FIG. 2 with an elevator of the tailplane in the neutral position showing a pressure distribution on a lower side of the tailplane during the exemplary flight condition of FIG. 9A.

FIGS. 9A and 9B illustrate simulations of pressure distributions on the lower surface of a baseline tailplane having baseline airfoil shape 40 (see FIG. 9A) and on the lower surface of tailplane 24 in accordance with the present disclosure (see FIG. 9B) respectively with the elevator in the neutral position during an exemplary flight condition. The exemplary flight condition may be a dive condition where a maximum airspeed of aircraft 10 may be approached or reached. For example, such maximum airspeed may be about Mach 0.89 for a business jet of the type shown in FIG. 1.

The darker regions 46A and 46B in the pressure distributions shown in FIGS. 9A and 9B represent regions of high velocity flow and consequently regions of low (e.g., negative) pressure. FIG. 9A shows that a region of low pressure 46A is located in an inboard portion of the baseline tailplane and also in front of the elevator of the baseline tailplane. As mentioned above the inboard position of the region of low pressure 46A may be due at least in part to the (e.g., 3-dimensional) influence of fin 22 on the flow characteristics under the baseline tailplane and also under tailplane 24. In FIGS. 9A and 9B, the values corresponding to the illustrated pressure distributions may be those of a pressure coefficient $C_p$. The pressure coefficient $C_p$ may be a dimensionless number which may be used to describe the relative pressures throughout a flow field in fluid dynamics. For example, the pressure coefficient $C_p$ may be represented by the following equation 1:

$$C_p = \frac{P - P_0}{\frac{1}{2}\rho v_0^2},\qquad\text{(equation 1)}$$

where P is the static pressure at the point of interest, $P_0$ is the free stream static pressure, $v_0$ is the free stream velocity and p is the free stream density.

FIG. 9B shows that, due at least in part to the shape of tailplane 24, region of low pressure 46B may be shifted forward (i.e., away from elevator 32) in relation to region 46A in FIG. 9A. Region of low pressure 46B may also be spread over a greater area than region 46A and the magnitude of the low pressure in regions 46B may be less severe than in region 46A. In other words the pressure in region 46B may not be as low as in region 46A and hence the maximum airspeed in region 46B may not be as high as the maximum airspeed in region 46A of the baseline tailplane. Region 46B may also be more spread out along the span S of tailplane 24 in comparison with region 46A, which may be more concentrated in an inboard region (e.g., root 24A) of the baseline tailplane.

The reduced maximum airspeed under tailplane 24 may reduce the likelihood of a shock developing under tailplane 24 due to the airspeed reaching or exceeding the speed of sound. The forward shift of region 46B away from elevator 32 also may reduce the likelihood of such shock migrating under elevator 32 and requiring a high force to deflect elevator 32 upwardly relative to stabilizer 30 in order to overcome the high pressure differential between the upper and lower sides of elevator 32. In various embodiments, the formation of one or more shocks under tailplane 24 during a dive condition may be acceptable, but it may be preferable that such shock(s) not be located directly under elevator 32.

Figure 10A:
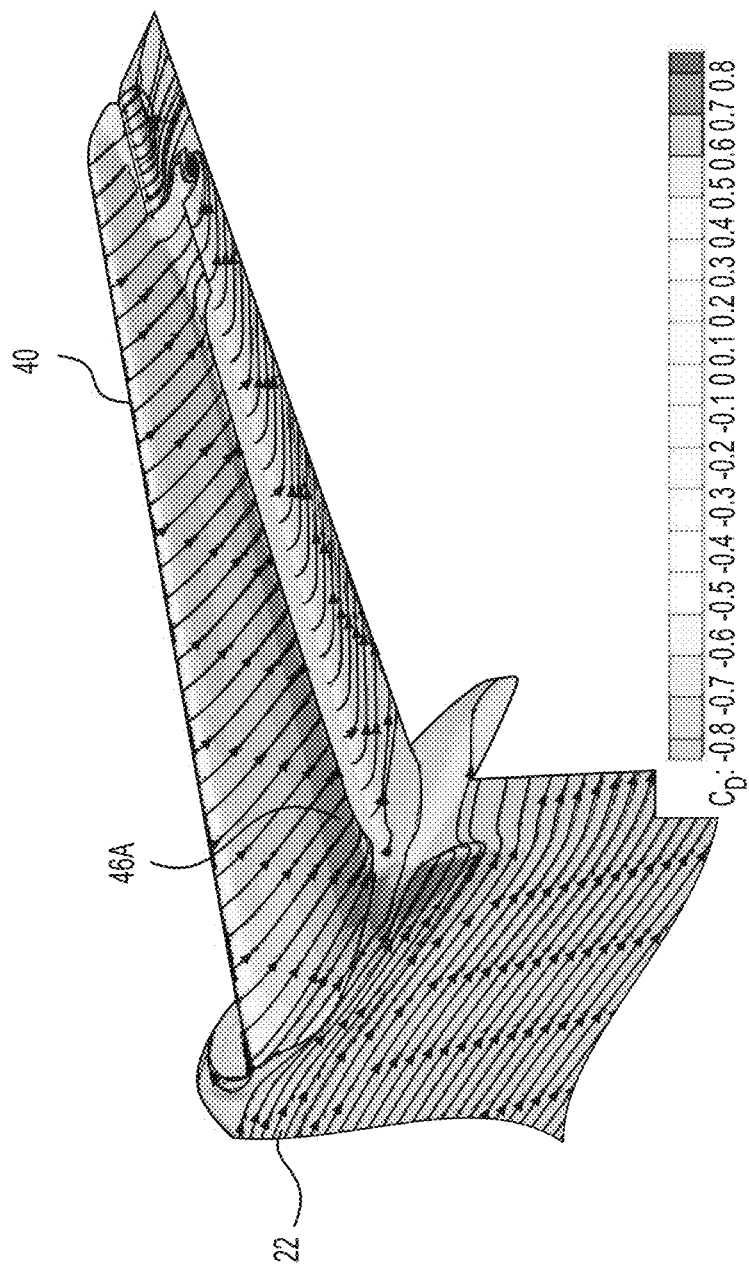
FIG. 10A is an axonometric view of the baseline tailplane of FIG. 9A with the elevator in an upwardly deflected position showing a pressure distribution on the lower side of the baseline tailplane during an exemplary flight condition.
Figure 10B:
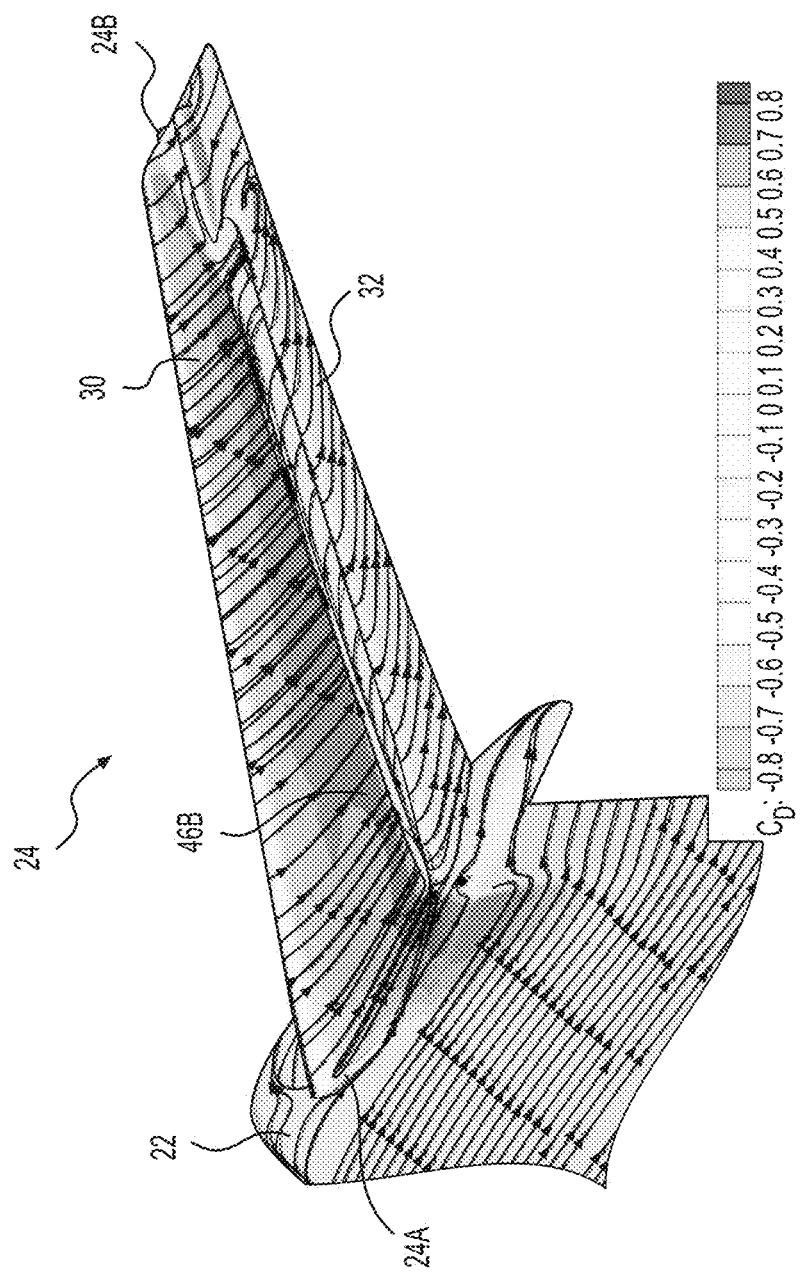
FIG. 10B is an axonometric view of the tailplane of the empennage of FIG. 2 with the elevator of the tailplane in the upwardly deflected positions showing a pressure distribution on the lower side of the tailplane during the exemplary flight condition of FIG. 10A.

FIGS. 10A and 10B illustrate simulations of pressure distributions on the lower surface of the baseline tailplane of FIG. 9A and on the lower surface of tailplane 24 of FIG. 9B respectively with the elevator deflected upwardly by 5 degrees during the same exemplary flight condition. As mentioned above, the exemplary flight condition may be a dive condition where a maximum airspeed of aircraft 10 (e.g. Mach 0.89) may be approached or reached. The upward deflection of elevator 32 may be commanded by a pilot or auto-flight system of aircraft 10 to pull out of the dive condition.

The darker regions 46A and 46B in the pressure distributions shown in FIGS. 10A and 10B represent regions of high velocity flow and consequently low pressure. Again, FIG. 10A shows that region of low pressure 46A is located at an inboard portion of the baseline tailplane and also in front of the elevator of the baseline tailplane. As mentioned above, the inboard position of the region of low pressure 46A may be due at least in part to the (e.g., 3-dimensional) influence of fin 22 on the flow characteristics under the baseline tailplane and also under tailplane 24. In FIGS. 10A and 10B, the values corresponding to the illustrated pressure distributions may be those of a pressure coefficient $C_p$ as defined above.

The areas of low pressure 46A and 46B may be greater in FIGS. 10A and 10B than in FIGS. 9A and 9B due at least in part to the upward deflection of the elevator, which may cause an acceleration of the air flow under the tailplane. FIG. 10B shows that, due at least in part to the shape of tailplane 24, region of low pressure 46B may again be shifted forward (i.e., away from elevator 32) in relation to region 46A in FIG. 9A. Region 46B may also be more spread out along the span S of tailplane 24 in comparison with region 46A, which may be more concentrated in an inboard region (e.g., root 24A) of the baseline tailplane.

In various embodiments the alteration of the flow conditions under tailplane 24, due at least in part to the positive camber in at least one portion of tailplane 24, may result in less force being required to deflect elevator 32 upwardly during certain flight conditions (e.g., dive) in comparison with conventional tailplane designs. For example, the spreading out of lower pressure region(s) 46A, 46B and also the shifting of low pressure region(s) 46A, 46B forward may result in a shock developed under tailplane 24 not migrating to be directly positioned under elevator 32. In various embodiments, even though a shock may develop under elevator 32, some reduction in force required to move elevator 32 may be achieved if the shock is positioned closer to a forward portion of elevator 32 than closer to an aft portion of elevator 32. In various embodiments, the positive camber may result in moving such shock forward with respect to tailplane 24 in comparison with conventional symmetric or negatively cambered tailplanes.

Figure 11:
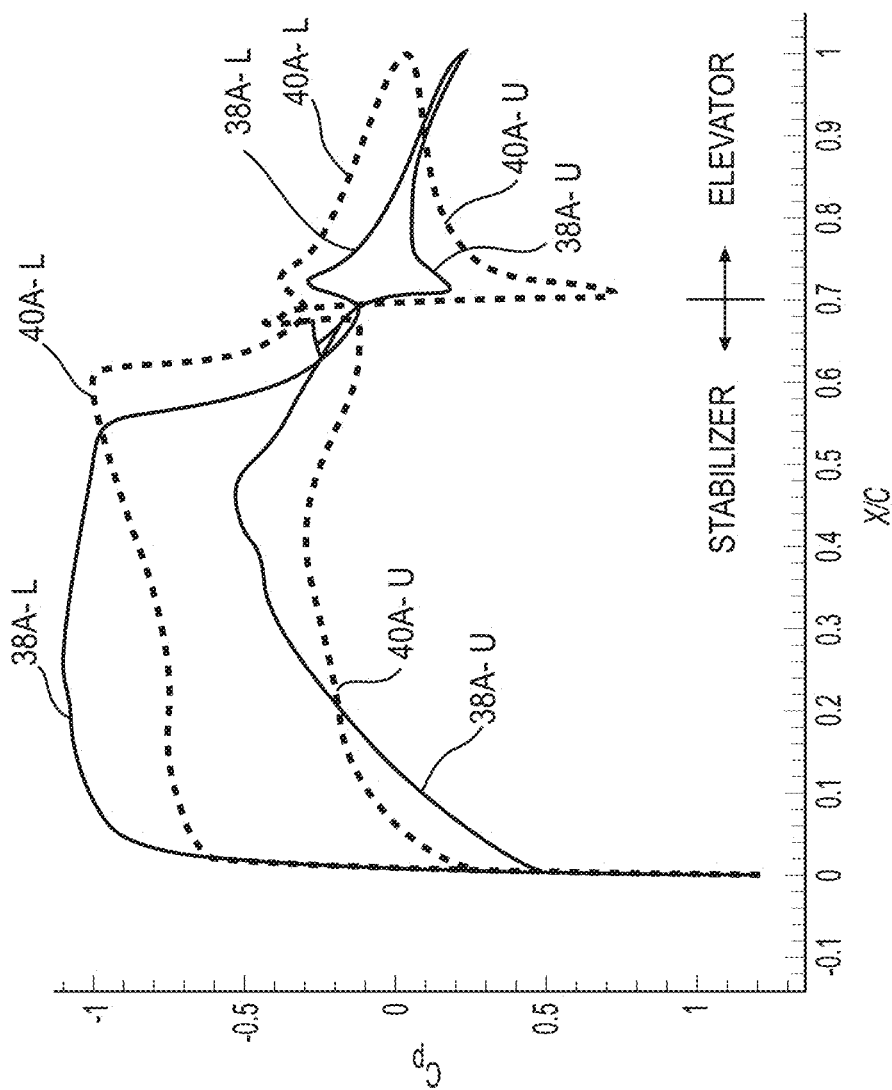
FIG. 11 shows a plot of the pressure distribution on the upper and lower sides of a root portion of the tailplane of the empennage of FIG. 2 and of a root portion of the baseline tailplane.

FIG. 11 shows a plot of the pressure distribution on the upper and lower sides of a root portion of tailplane 24 and of a root portion of the baseline tailplane characterized above. The values plotted in FIG. 11 are representative of a flight condition where elevator 32 may be deflected upwardly by 5 degrees and also where a maximum airspeed of aircraft 10 may be approached or reached. Specifically, the plot of FIG. 11 shows the pressure distribution across airfoil cross-sectional shape 38A with a positive camber as shown in FIG. 3A and baseline cross-sectional shape 40A also as shown in FIG. 3A. The values along the ordinate (i.e., y-axis) of the plot are expressed in pressure coefficient $C_p$, as defined by equation 1 above, in reverse order (i.e., negative values upwardly and positive values downwardly). The values along the abscissa (i.e., x-axis) of the plot are expressed as normalized values of the position along the respective chords (i.e., the distance from the leading edge over the chord length). The interface between stabilizer 30 and elevator 32 is at approximately 70% of the chord length.

Curve 38A-U is representative of the pressure distribution on the upper side of the root portion (e.g., airfoil cross-sectional shape 38A) of tailplane 24 and curve 38A-L is representative of the pressure distribution on the lower side of the root portion of tailplane 24. Curve 40A-U is representative of the pressure distribution on the upper side of the root portion (e.g., baseline cross-sectional shape 40A) of the baseline tailplane and curve 40A-L is representative of the pressure distribution on the lower side of the root portion of the baseline tailplane. The pressure differential (i.e., gap) between curve 38A-U and curve 38A-L and also the pressure differential (i.e., gap) between curve 40A-U and curve 40A-L may be used to determine a force differential between upper and lower surfaces of tailplane 24 and of the baseline tailplane respectively by integrating the pressures over corresponding surface areas of the corresponding tailplanes. The plot of FIG. 11 shows that along the elevator portion of the tailplanes (i.e., beyond 70% of the chord length) the difference between curves 38A-U and 38A-L of tailplane 24 may be less than the difference between curves 40A-U and 40A-L of the baseline tailplane. This reduced pressure differential across the upper and lower surfaces of elevator 32 of tailplane 24 may be indicative of a reduced hinge moment and consequently a reduced amount of force being required to deflect elevator 32 upwardly in this exemplary flight condition, in comparison with the baseline tailplane.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. Also, one skilled in the relevant arts will appreciate that while the devices, assemblies and aircraft shown herein may comprise a specific number of elements/components, the devices, assemblies and aircraft could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

What is claimed is:

1. A tailplane of an aircraft, the tailplane comprising:
a stabilizer having a fixed shape; and
an elevator movably secured to the stabilizer, the elevator being movable from a neutral position relative to the stabilizer, the stabilizer and the elevator defining an airfoil cross-sectional shape having a positive camber when the elevator is in the neutral position;
wherein an amount of camber of the airfoil cross-sectional shape varies along a span of the tailplane.

2. The tailplane as defined in claim 1, wherein the positive camber is greater in an inboard portion of the tailplane than in an outboard portion of the tailplane.

3. The tailplane as defined in claim 2, wherein the inboard portion of the tailplane is positively cambered and the outboard portion of the tailplane is negatively cambered.

4. The tailplane as defined in claim 1, wherein the positive camber in at least one portion of the tailplane is at least 0.25% of a corresponding chord length of the airfoil cross-sectional shape.

5. The tailplane as defined in claim 1, wherein a maximum positive camber of the airfoil cross-sectional shape is between 0.25% and 8% of a corresponding chord length of the airfoil cross-sectional shape.

6. The tailplane as defined in claim 5, wherein the maximum positive camber of the airfoil cross-sectional shape is between 0.5% and 4% of a corresponding chord length of the airfoil cross-sectional shape.

7. The tailplane as defined in claim 5, wherein the maximum positive camber of the airfoil cross-sectional shape is located between 30% and 80% of a chord of the airfoil cross-sectional shape from a leading edge of the airfoil cross-sectional shape.

8. The tailplane as defined in claim 7, wherein the maximum positive camber of the airfoil cross-sectional shape is located between 40% and 70% of the chord of the airfoil cross-sectional shape from the leading edge of the airfoil cross-sectional shape.

9. The tailplane as defined in claim 5, wherein the maximum positive camber is disposed at a root portion of the tailplane adjacent to a structure of the aircraft.

10. The tailplane as defined in claim 1, comprising an inboard portion configured to be secured to a structure of the aircraft and an outboard portion, an amount of camber of the airfoil shape being different in the inboard portion than in the outboard portion of the tailplane.

11. The tailplane as defined in claim 10, wherein the positive camber of the airfoil shape is greater in an inboard portion of the tailplane than in an outboard portion of the tailplane.

12. An aircraft comprising the tailplane as defined in claim 1.

13. A tailplane of an aircraft, the tailplane comprising:
a stabilizer having a fixed shape; and
an elevator movably secured to the stabilizer, the elevator being movable from a neutral position relative to the stabilizer, the stabilizer and the elevator defining an airfoil having an amount of camber that varies along a span of the tailplane when the elevator is in the neutral position;
wherein at least a portion of the airfoil is positively cambered.

14. An empennage of an aircraft, the empennage comprising:
an empennage structure; and
a horizontal tailplane secured to the empennage structure, the horizontal tail plane including a horizontal stabilizer having a fixed shape and an elevator movably secured to the horizontal stabilizer, the elevator being movable from a neutral position relative to the horizontal stabilizer, the horizontal stabilizer and the elevator defining an airfoil shape having a positive camber in at least one portion of the tailplane when the elevator is in the neutral position;
wherein an amount of camber of the airfoil cross-sectional shape varies along a span of the tailplane.

15. The empennage as defined in claim 14, wherein the positive camber is greater in an inboard portion of the tailplane than in an outboard portion of the tailplane.

16. The empennage as defined in claim 15, wherein the inboard portion of the tailplane is positively cambered and the outboard portion of the tailplane is negatively cambered.

17. The empennage as defined in claim 14, wherein a maximum positive camber of the airfoil cross-sectional shape is between 0.25% and 8% of a corresponding chord length of the airfoil cross-sectional shape.

18. The empennage as defined in claim 17, wherein the maximum positive camber is between 0.5% and 4%.

19. The empennage as defined in claim 17, wherein the maximum positive camber of the airfoil cross-sectional shape is located between 30% and 80% of a chord of the airfoil cross-sectional shape from a leading edge of the airfoil cross-sectional shape.

20. The empennage as defined in claim 19, wherein the maximum positive camber of the airfoil cross-sectional shape is located between 40% and 70% of the chord of the airfoil cross-sectional shape from the leading edge of the airfoil cross-sectional shape.

21. The empennage as defined in claim 14, wherein an inboard portion of the tailplane is movably secured to the empennage structure.

22. The empennage as defined in claim 14, wherein the empennage structure comprises a fin to which a root portion of the horizontal tailplane is secured.

23. The empennage as defined in claim 22, wherein the root portion of the horizontal tailplane is positively cambered.

* * * * *